United States Patent [19]
Engelmayer et al.

[11] Patent Number: 6,018,313
[45] Date of Patent: Jan. 25, 2000

[54] SYSTEM FOR DETERMINING THE LOCATION OF MOBILE OBJECTS

[75] Inventors: Wolfgang Engelmayer, Bad Honnef; Walter Lindstrot, Wachtberg; Paul Raven, Graftschaft; Stefan Sandmann, Bonn; Guenter Schoemakers, Troisdorf, all of Germany

[73] Assignee: Tilmar Konle, Munich, Germany

[21] Appl. No.: 08/913,935

[22] PCT Filed: Aug. 31, 1997

[86] PCT No.: PCT/EP96/03828

§ 371 Date: Sep. 25, 1997

§ 102(e) Date: Sep. 25, 1997

[87] PCT Pub. No.: WO97/09635

PCT Pub. Date: Mar. 13, 1997

[30] Foreign Application Priority Data

Sep. 1, 1995 [DE] Germany .............................. 195 32 362
Oct. 19, 1995 [DE] Germany .............................. 195 38 876

[51] Int. Cl.$^7$ .................................................. G01S 5/02
[52] U.S. Cl. ........................................... 342/357; 701/215
[58] Field of Search ............................. 342/357; 701/213, 701/214, 215

[56] References Cited

U.S. PATENT DOCUMENTS

| | | | |
|---|---|---|---|
| 5,345,245 | 9/1994 | Ishikawa et al. | 342/357 |
| 5,422,813 | 6/1995 | Schuchman et al. | 342/357 |
| 5,477,228 | 12/1995 | Tiwari et al. | 342/357 |

FOREIGN PATENT DOCUMENTS

| | | |
|---|---|---|
| 0574009 | 12/1993 | European Pat. Off. . |
| 4136136 | 3/1993 | Germany . |
| 4137000 | 5/1993 | Germany . |
| 4411725 | 10/1994 | Germany . |
| 9319564 U | 6/1995 | Germany . |
| 19508208 | 10/1995 | Germany . |
| 4424412 | 1/1996 | Germany . |
| 2264837 | 9/1993 | United Kingdom . |
| 2287149 | 9/1995 | United Kingdom . |
| 87/06713 | 11/1987 | WIPO . |
| 94/24578 | 10/1994 | WIPO . |
| 95/18977 | 7/1995 | WIPO . |
| 95/18978 | 7/1995 | WIPO . |

OTHER PUBLICATIONS

W. Lindstrot: "Taking the Measure of GPS in Nordrhein–Westfalen". In: GPS World, Mar. 1993, pp. 40–44.

(List continued on next page.)

*Primary Examiner*—Gregory C. Issing
*Attorney, Agent, or Firm*—Venable; George H. Spencer

[57] ABSTRACT

To reduce the transfer capacity requirements for correction data in a differential GPS system, while notably improving the interpretability of any correction data having suffered transmission interference and ensuring that such correction be as up to date as possible, continuous error readings (7) are calculated from a steady stream of GPS signals (12, 22, 32, 42) received from a reference GPS receiver (50) and from the known co-ordinates of its location (6). According to the invention, an evaluation system (60) is provided which, at a specific point in time recalculates the correction readings rounded off to the last full minute. The correction reading (8), calculated by the evaluation system, is then transmitted by at least one radio transmitter (80) in a radio data signal (RDS) included in its program signal. Attached to the mobile object (5), whose situation co-ordinates are determined by a mobile GPS receiver (120), is a radio receiver (90) to which are connected an RDS decoder (100) for receiving and decoding the received RDS signals incorporating the processed correction readings (8) and a computer (110) which extracts the correction readings (7) from the decoded RDS and updates them to the present time. The computer also reconstructs a standard correction signal (7) complying with the RTCM standard. The reconstructed, standard correction data are finally fed to the GPS receiver which then corrects its reading according to the reconstructed correction readings (7) received.

8 Claims, 5 Drawing Sheets

OTHER PUBLICATIONS

C. Bergström: "Correction Data for Navstar Global Positioning System Transmitted in the RDS Channel." In: IEE Colloquium RDS (Radio Data Service) Digest 1994/249, UK, Dec. 15, 1994, pp. 3/1–3/5.

J. Spalding et al.: "Differential GPS Integrity Motor". In: IEEE 1994 Position Location and Navigation Symposium New York, 1994, Apr. 11–15, 1994, pp. 225–232.

P. Schwab: "An In–Receiver Database—The Critical Factor in RBDS". In: IEEE Transactions on Consumer Electronics, vol. 39, No. 3, Aug. 1993, pp. 442–447.

C. Scott: "An Overview of the Communication Options for Broadcast DGPS Corrections." In: Australian Journal of Geodesy, Photogrammetry and Surveying, Jun. 1993, No. 58, pp. 69–84.

FIG.1

PRIOR ART

SYSTEM FOR DETERMINING THE LOCATION OF MOBILE OBJECTS

DESCRIPTION

The invention relates to a system according to the preamble of claim 1 and to a receiving arrangement according to the preamble of claim 6. A system and a receiving arrangement of this type were disclosed in DE 41 36 136 C1.

For the position finding and navigation of travelling objects, a satellite-based method which was introduced under the name "Global Positioning System (GPS System)"[1] is known, wherein so-called GPS satellites emit the time in addition to their orbital data with great precision, for example, on the 1.575 GHz frequency. The orbit of the GPS satellites extends such that their position changes continuously relative to a stationary point on the earth. A GPS receiver calculates the distance to the individual GPS satellites by measuring the time which the signal takes to travel from the satellite to the receiver. Since the positions of the GPS satellites are known, the space coordinates of the receiver location on the earth and the errors of the internal clock of the GPS receiver can be calculated by means of four GPS satellites. However, this only accomplishes a precision of approx. ±100 meters. Since this precision is not sufficient for many applications, it is known (RTCM Recommended Standards for Differential GPS Service", Version 2.1, Chapter 4, of Jan. 3, 1994, published by Radio Technical Commission for Maritime Services, 655 Fifteenth Street, NW, Suite 300, Washington, D.C. 20005 U.S.A)[2] to determine error values from a reference GPS receiver whose location coordinates are known precisely and to transmit them in the form of correction data. The GPS measurement data determined by a mobile GPS receiver are corrected with the assistance of the received correction data. The data format of the correction data defined in the RTCM Standard ensues from the above-mentioned passage in the literature, pages 4-3 and 4-8 as follows:

[1] Translator's note: The term "Global Positioning System (GPS System)" appears in English in the original German text.
[2] Translator's note: The text portions in parenthesis (RTCM Recommended Standards . . . " to " . . . Chapter 4" and "Radio Technical Commission . . . " to " . . . U.S.A)" appear in English in the original German text.

For each individual GPS satellite, there is a separate "message" comprised of a scale factor, an indication regarding the error range (UDRE=User Differential Range Error), an identification of the satellite concerned (satellite ID), so-called pseudo range correction values (PRC=Pseudo Range Correction), a check signal (parity), values for the expected rate of change of the PRC data (RRC=Rate Range Correction), and an indication specifying the orbital data to which the correction values are related (issue of data). The individual "messages" are joined directly to one another to form a string, with the string being divided into a sequence of words of 30 bit length regardless of the boundaries of the individual "messages". Each string of "messages" is preceded by a header comprised of two words of 30 bit length so as to mark the beginning of each string. The first 30 bit word of the header is comprised of a run-in sequence (preamble), followed by an identification of the type of the subsequent messages (message type), an identification of the transmitting station (station ID) and a check word (parity). The second 30 bit word of the header is comprised of a time information (modified Z-count), a sequence number, an indication regarding the total length of the subsequent "messages" (length of frame), an indication regarding the condition of the transmitting station (station health) and a check word (parity).

For the real-time transmission of the correction data, DE 41 36 136 C1 discloses to use the existing transmitter network of the broadcast corporations, with the correction data being inserted into free groups of 37 bit each of the cyclically transmitted radio data (RDS) signal, which groups are being transmitted inaudibly within the radio program signals. Since the data format of the radio data system does not match the above-described data format of the GPS correction data, the header and the subsequent "messages" of each string are divided into fragments of 37 bit each which are allocated to the free RDS groups in successive RDS signal cycles. The fragmentary contents of such an RDS group is entirely random and, as such, it cannot be identified. The data format of the GPS correction data can be put together again from the fragments and can be evaluated only if all RDS groups, to which the header and the successive "messages" of each string were allocated, are successively received without disturbances. The failure of only a single RDS group, for example, in the event of a VHF receiving disturbance, results in the loss of the information of the entire string, which means that the correction values of all "messages" associated with the string are lost, i. e., for all associated GPS satellites. In addition, the duration of the transmission of correction "messages" for all GPS satellites, i. e., of a string, takes several seconds because of the limited capacity of the RDS system, even if each RDS cycle (cycle duration 1 second) is occupied by three RDS groups; this causes the correction values calculated simultaneously for all GPS satellites to be less and less up to date as the duration of the transmission of a string progresses. This aging problem becomes more acute as less and less free capacity is available in the RDS system for the transmission of the correction values because, for example, other services require capacity in the RDS system, if necessary.

In contrast, it is the object of the invention to improve a system of the type mentioned at the outset such that the demand for transmission capacity is reduced, the ability to interpret the correction data is significantly improved in the event of transmission disturbances and the currentness of the transmitted correction data is improved. Furthermore, a receiving arrangement is to be created which implements these objectives on the receiver end.

This object is accomplished according to the invention by the features of the independent claims 1 and 6.

Advantageous embodiments and modifications of the system according to the invention and of the receiving arrangement according to the invention ensue from the dependent claims 2 to 5 and 7 and 8, respectively.

The invention is explained by way of example with reference to the drawing. The drawing shows.

[3] Translator's note: Here and throughout the text, the term "Differential GPS" appears in quotation marks in English in the original German text.

derived from the received GPS signals.

Figure 1:
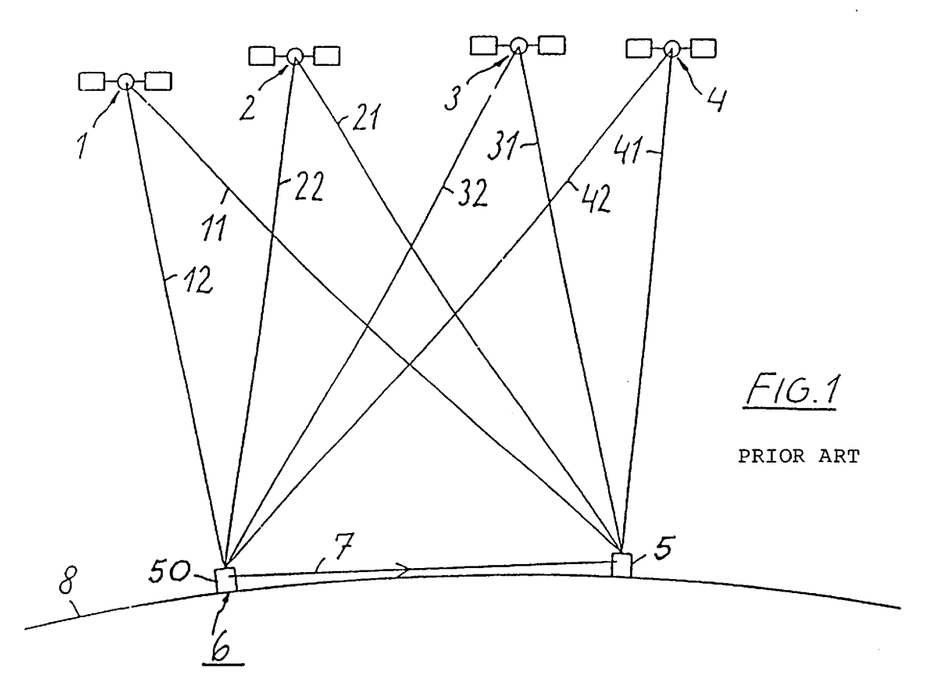
FIG. 1 a schematic representation of a known position-determining system according to the so-called "Differential GPS"[3]

As is shown in FIG. 1, the illustrated position-determining system is based on so-called GPS satellites 1 to 4 orbiting around the earth in such a manner that their position relative to a stationary point on the earth changes continuously. The number of four GPS satellites shown only represents the minimum number; in reality, there is a much greater number of GPS satellites orbiting around the earth in a finely-meshed net.

Figure 3:
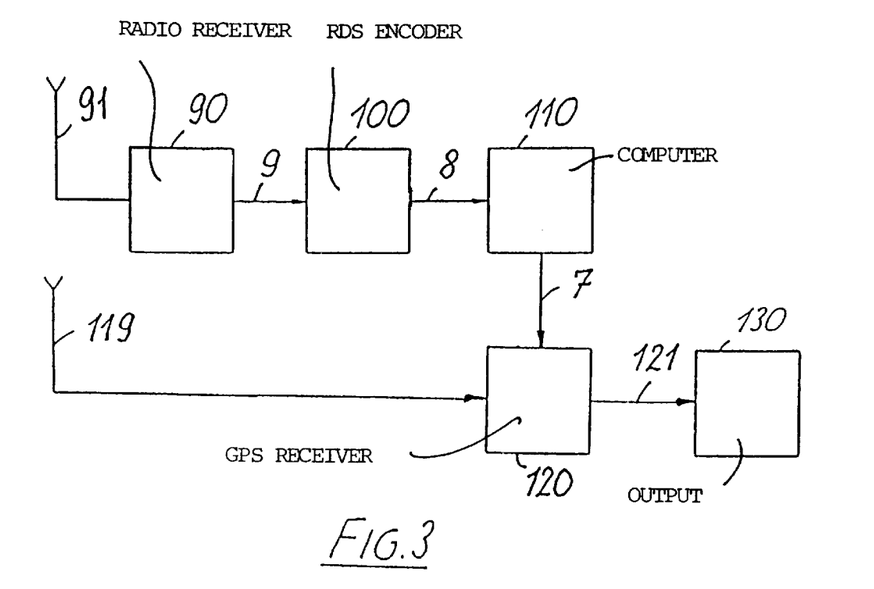
FIG. 3 a block diagram of the receiver-end components of the system according to the invention.

A GPS receiver 120 (FIG. 3) built into a mobile object 5 on the earth's surface 8 can determine its space coordinates on the basis of the received GPS signals 11, 21, 31 and 41, but only with a precision of approximately ±100 meters due to error sources which are in part system-inherent and in part caused by atmospheric disturbances. To improve the measuring accuracy, the so-called "Differential GPS" is provided at location 6 with a fixedly installed reference GPS receiving and processing unit 50 whose position coordinates are known precisely. From the GPS signals 12, 22, 32 and 42 received by the unit and from the known position coordinates, the reference GPS receiving and processing unit 50 continuously determines error values from which correction data 7 are formed in a standardized data format, which data are transmitted in real time to the GPS receiver 120 on the mobile object 5. Unit 50 comprises, for example, one or several GPS receivers as well as a downstream computer. The reference station software in this computer can supply, inter alia, the correction data 7. Alternatively, unit 50 may also be comprised of a single GPS receiver in which the generation of the correction data 7 takes place through integrated components. Based on the correction data 7 received by the mobile GPS receiver 120, the measured instantaneous position coordinates can be corrected to a precision of up to ±1 meter. These values are only valid within a certain periphery around the reference GPS receiving and processing unit 50.

Figure 2:
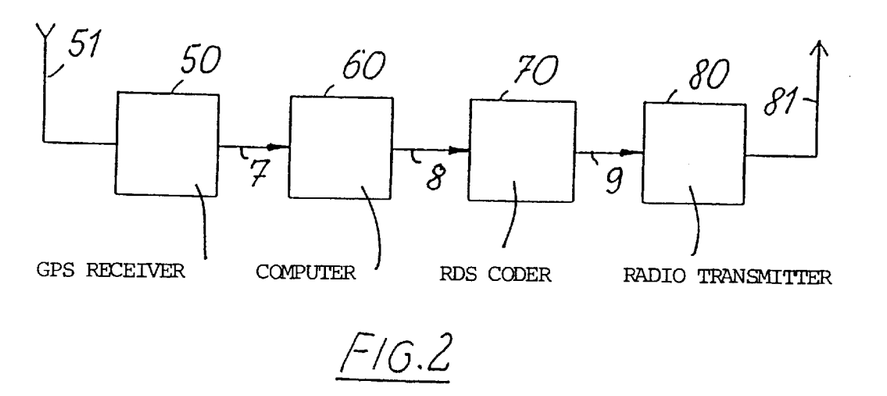
FIG. 2 a block diagram of the transmitter-type components of the system according to the invention.

In order to ensure an area-wide transmission of the correction data 7, the system according to the invention provides that the correction data 7 are transmitted within radio program signals. For this purpose, coordinates are determined (measured values) from the GPS signals 12 to 42 received by the reference GPS receiving and processing unit 50 via a satellite receiving antenna 51, as is illustrated in FIG. 2; but these coordinates are skewed because of various influences. By means of comparison with the location coordinates of the receiving antenna 51, which are known exactly, the reference GPS receiving and processing unit 50 generates standardized correction data 7. These correction data 7 are processed by a downstream computer 60 and are supplied to the RDS coder 70 of a radio station 80 (FM or AM station). The RDS coder 70 inserts the processed correction data 8 into the RDS data stream true to format in the manner which is described below in greater detail. The radio station 80 emits the thus supplemented RDS signal 9 area-wide within the radio program signal via the station's transmitter mast 81.

A radio receiver 90 (FIG. 3) provided on the mobile object 5 is tuned to the carrier frequency of the radio station 80 and receives the RDS signal 9 supplemented by the processed correction data 8 together with the radio program signal of the radio station 80 via the receiver's receiving antenna 91. In a downstream RDS decoder 100, the RDS signal 9 is separated from the radio program signal, is decoded and supplied to a computer 110 which separates the processed correction data 8 from the RDS signal and therefrom reconstructs standardized correction data 7. From the computer 110, the reconstructed, standardized correction data 7 are supplied to the GPS receiver 120 of the mobile object 5 which receives the GPS signals 11 to 41 via a satellite receiving antenna 119 and derives the measured coordinate values therefrom. The derived measured coordinate values are corrected within the GPS receiver 120 with the assistance of the reconstructed correction data 7. The GPS receiver 120 supplies the corrected coordinate values 121 to an output arrangement 130.

According to the Standard recited at the outset, the correction data 7 generated in the reference GPS receiving and processing unit 50 comprise—separately for each GPS satellite 1, 2, 3, 4—pseudo range correction values (in the following identified as PRC data) which are valid for the moment of their calculation. Furthermore, the correction data formed in the reference GPS receiving and processing unit include values for the rate of change of the PRC data. In the text that follows, these rate of change values are identified as RRC data. From the PRC data and the RRC data, the actual PRC value can be inferred at an actual moment which comes later than the moment of the calculation of the PRC data, with the precision of the assumed actual PRC value being a function of the exact extent to which the former rate of change picked up as PRC data corresponds with the actual rate of change.

Figure 4:
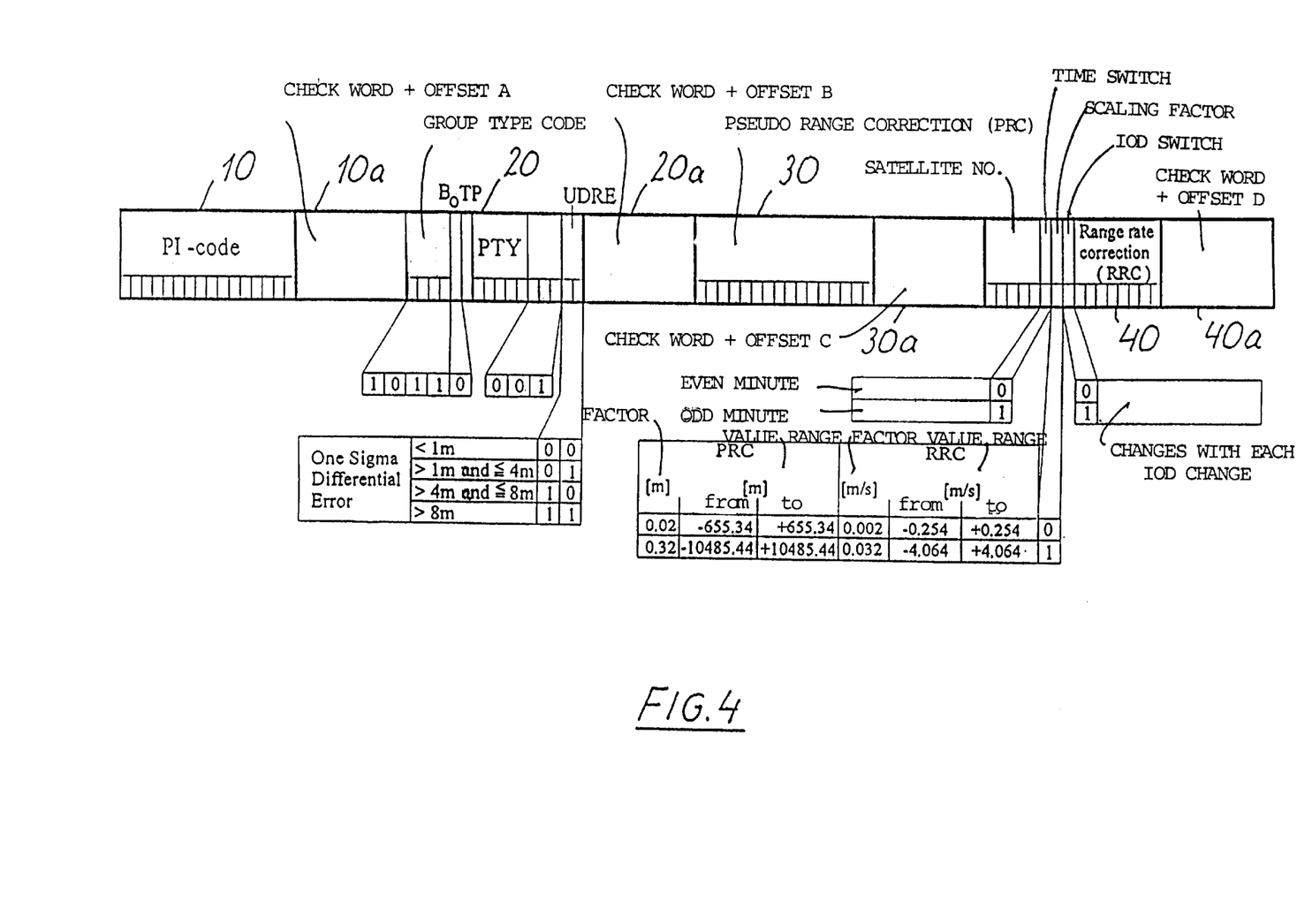
FIG. 4 a schematic diagram for the data format of a continuously transmitted RDS signal cycle with the complete correction data for a GPS satellite.

For the transmission of the correction data 7, the invention provides that the radio data system (RDS) for FM or AM radio is used, wherein an RDS data stream is modulated onto an auxiliary carrier of, for example, 57 kHz, which is inserted into the baseband of the program signal of an FM or AM radio station so as to be inaudible. The data format of the RDS data stream is comprised of cyclically transmitted data block sequences, with an RDS cycle, as is shown in FIG. 4, comprising longer data blocks 10, 20, 30 and 40 which are separated from one another by a shorter check word 10a, 20a, 30a, 40a, respectively. In each case, four data blocks 10, 20, 30 40 form an RDS group with a free data capacity of 37 bit. In the example considered in FIG. 4, the longer data blocks 10 and 20 include the program identification code PI and the program type code PTY according to the European RDS Standard (CENELEC)[4] EN 50067. The free data capacity of the RDS group is used for incorporating the correction data for a GPS satellite, with the PRC data being inserted into block 30 and the RRC data being inserted into block 40 together with the identification ("satellite no.") of the respective GPS satellite, a time flag ("time switch"), the scale factor and an IOD flag ("IOD switch").

[4] Translator's note: CENELEC=Comité Européen de Normalisation Electrotechnique=European Committee for Electrotechnical Standardization.

In order to reduce the data volume of the PRC data and of the RRC data for each satellite to the data capacity of a group of the RDS signal cycle, i. e., to 37 bit, the standardized data format of the GPS correction values (see the Standard for Differential GPS Service discussed at the outset) does not transmit the header and the check words (parity). The check words (parity) of the RTCM standard can be readily omitted because the RDS data format already contains format-inherent check words in the shorter data blocks between respectively two longer data blocks. But the abandonment of the header implies the abandonment of the continuous transmission of the information (modified Z count) regarding the moment of the calculation of the correction values for all GPS satellites. So as to be able to allocate the correction values with respect to time in spite of this abandonment, the invention provides that the PRC data are calculated back in the computer 60 (FIG. 2) to the respectively last full minute with the assistance of the RRC data. This is intended to be explained by way of the following example:

At the moment 12:01:11, the Z-count has the value 71 (60 seconds plus 11 seconds after the moment 12:00:00). The PRC value is assumed to be +10.32 m, the RRC value is assumed to be +0.98 m/s.

At the rate of change (RRC value) of +0.98 m/s, the calculation back to the moment 12:01:00 (Z count with value 60) results in a PRC value of −0.46 m (+10.32 m minus 0.98 m/s×11 s).

The calculated-back PRC data are transmitted together with the RRC data as processed correction data 8. The receiver-end computer 110 again extrapolates the calculated-back PRC data with the assistance of the associated RRC data and of a computer-internal Z count to the momentary actual value. This is intended to be explained by way of the following example:

At the rate of change (RRC value) of +0.98 m/s, the extrapolation to the moment 12:01:12 (Z count with value 72) results in a PRC value of +11.30 m (−0.46 m plus 0.98 m/s×12 s).

Figure 5:
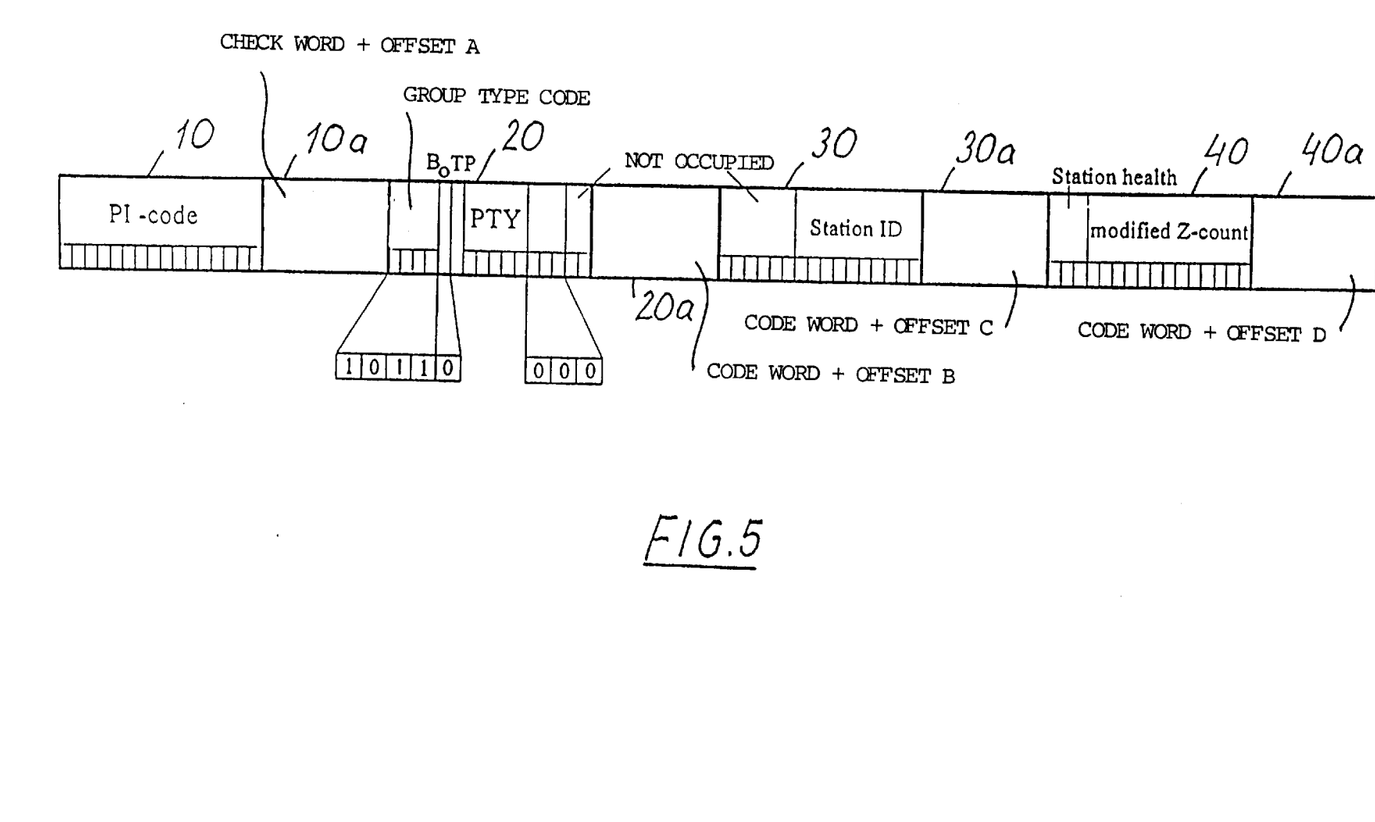
FIG. 5 a schematic diagram for the data format of an occasionally transmitted RDS signal cycle with a time information (modified Z count) derived from the received GPS signals, and FIG. 6 a schematic diagram for the data format of an RDS signal cycle with a data identification information (IOD)
Figure 6:
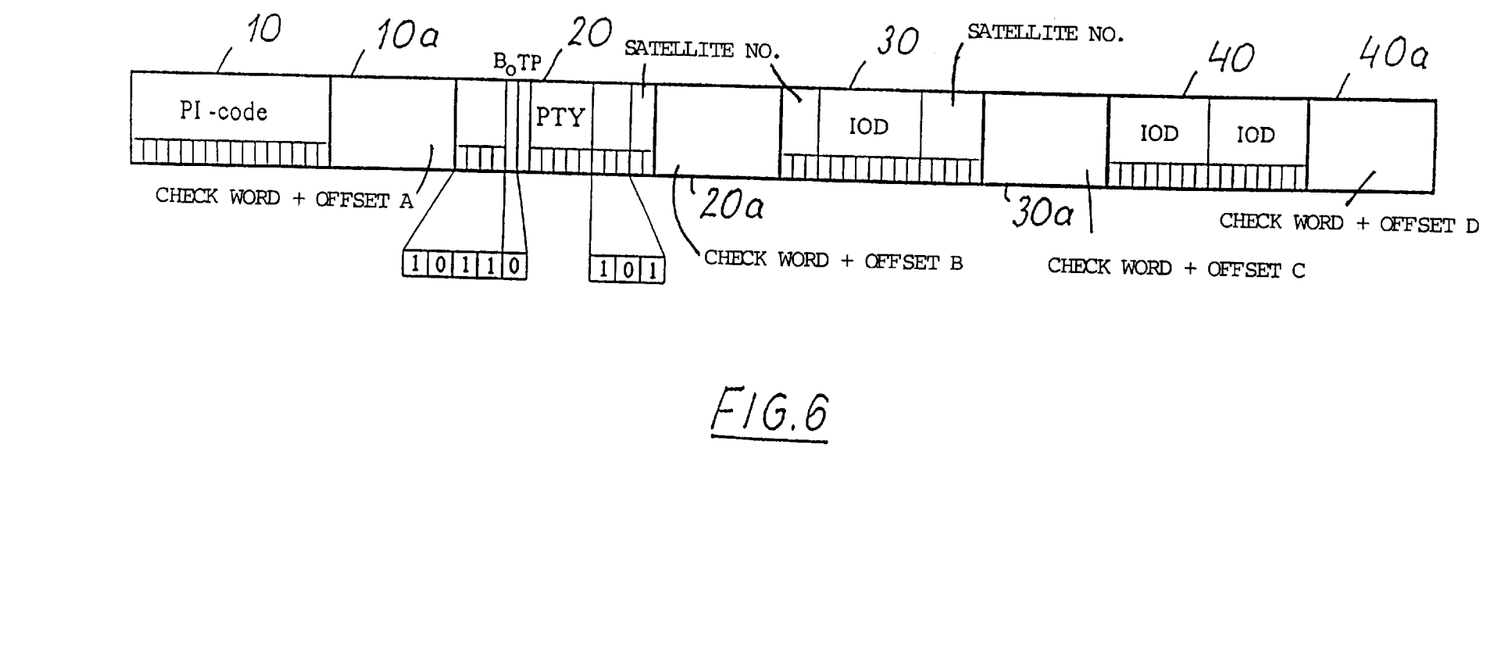

To ensure that the computer 110 always recognizes beyond any doubt for which full minute the received calculated-back PRC values are valid, the above-mentioned time flag (0=even minute; 1=odd minute) is also transmitted in block 40. Furthermore, the computer-internal Z count is synchronized from time to time, for example, 1 to 2 times per minute, by a time information (modified Z count) which, according to FIG. 5, is emitted occasionally together with the station identification (station ID) in the blocks 30 and 40 instead of the occupancy according to FIG. 4. Furthermore, the identification IOD (identification of data) is occasionally emitted in the blocks 30 and 40 so as to transmit with different frequency all data and identifications to the computer 110 which the computer needs in order to again put together a standardized RTCM correction signal from the partial information arriving in the RDS data stream. The computer 110 readily derives the parity check words of the RTCM correction signal conforming to standards from the received partial information according to the parity rule it is familiar with and inserts the signal according to standards.

By reducing the correction data per satellite to 37 bit, it is not only possible to transmit all correction data of a satellite in a single RDS group (37 bit capacity), which for nine satellites is a reduction from originally 680 bit to 333 bit (9×37), but an unambiguous, reproducible allocation of the RDS data format to the RTCM data format is accomplished. Therefore, the loss of an RDS group in the event of a transmission disturbance no longer means that the correction data for all nine satellites will be lost, as is the case in the state of the technology, but only the correction data for the one satellite associated with the disturbed RDS group will be lost.

In this manner, the system according to the invention can accomplish a significantly improved immunity to disturbances of the transmission.

To improve the currentness of the transmitted correction data, the PRC and RRC data associated with the remaining satellites are updated in the computer 110 after every insertion of PRC and RRC data into an RDS group. In this manner, the average age of the correction data can be reduced by more than half compared to the state of the technology, wherein the correction data must be calculated for all satellites at a common moment and must be transmitted without the possibility of updating them because of the fragmentary insertion into the RDS data stream.

A further option for improving the currentness of the data is to insert those PRC data, whose rate of change (RRC) remained the same or almost the same, into the RDS data stream with a lesser priority than PRC data whose rate of change (RRC) changes more drastically. Such a faster renewal of a more poorly predicted RRC value by a more updated RRC value further increases the precision of the position correction. To implement such a priority control for the selection of the satellites, at least two predictions are calculated for each satellite within a time period of, for example, 20 seconds. The one prediction is based on the actual PRC and RRC values, another prediction on the previously sent out PRC and RRC values. The deviation within several predictions represents an error which can be of a different size for the individual satellites so that the size of this error serves as a criterion for the decision regarding priority.

We claim:

1. A system for determining the position of mobile objects (5) with the assistance of position-finding and navigation satellites (GPS satellites 1, 2, 3, 4) which continuously change their position relative to a stationary point on the earth and emit GPS signals (11, 21, 31, 41) that permit a GPS receiver (120) installed on the mobile object (5) to determine its instantaneous position coordinates, the system comprising at least one GPS receiving and processing unit (50) operating as a reference whose precise position coordinates are known, with the unit determining continuous error values from the continuously received GPS signals (12, 22, 32, 42) and from the known position coordinates of its location (6) and generating correction data (7) therefrom, with the correction data (7) comprising pseudo range correction values (PRC data) valid for the moment of their calculation, and values (RRC data) for the instantaneous rate of change of the RRC data;

at least one radio station (80) with RDS coder (70) which emits the generated correction data (7) as data of a radio data system signal (RDS signal) which are inserted into its program signal;

a radio receiver (90) present on the mobile object (5) and having an RDS decoder (100) for receiving and decoding the RDS signal that is provided with the correction data (7), and a computer (110) for separating the correction data (7) from the decoded RDS signal and for feeding the correction data (7) into the GPS receiver (120) mounted on the mobile object (5), with the receiver correcting its measurement results according to the separated correction values (7), characterized in that a) downstream of the GPS receiving and processing unit (50) an evaluating device (60) is arranged which calculates back the PRC data, which were calculated at a specific moment, with the assistance of the associated rate of change values (RRC data) to the moment of the last full minute, and, for each GPS satellite, inserts into a single RDS group of an RDS signal cycle the calculated-back PRC data together with the associated RRC data and an identification of the satellite concerned, but while abandoning a header provided in a standard format for GPS correction signals;

b) in a computer (110) arranged downstream of the RDS decoder (100) of the radio receiver (90), the calculated-back PRC data are extrapolated to the actual time for each GPS satellite with the assistance of the associated rate of change values (RRC data) and computer-internally generated time information (internal Z count), and c) the non-transmitted header is reconstructed with check words and continuous time information in the computer (110) and, together with the extrapolated PRC data for each GPS satellite and the associated RRC data, is put together to form the standardized format of the correction data (7).

2. A system according to claim 1, characterized in that, after every insertion of the processed correction data (8) for a GPS satellite into an RDS signal cycle, the PRC data and RRC data are updated for all satellites.

3. A system according to claim 1, characterized in that the evaluating device (60) occasionally inserts a time information derived from the received GPS signals into a group of an RDS signal cycle, which time information is used by the computer (110) to synchronize the internally generated time information (internal Z count).

4. A system according to claim 1, characterized in that the evaluating device (60) occasionally inserts a data identification information (IOD) derived from the received GPS signals into a group of an RDS signal cycle, which data identification information is used by the computer (110) to reconstruct the standardized correction data (7).

5. A system according to claim 1, characterized in that the evaluating device (60) continuously determines for each GPS satellite the exact extent to which the rate of change last transmitted as RRC data corresponds with the actual rate of change value, and that the evaluating device (60) inserts the correction data for satellites with inferior matching of the actual rate of change on a priority basis compared to correction data for satellites with better matching of the rate of change into the RDS signal cycle for the purpose of a priority control.

6. A receiving arrangement for determining the position of mobile objects (5) with the assistance of position-finding and navigation satellites (GPS satellites) which continuously change their position relative to a stationary point on the earth and emit GPS signals that permit a GPS receiver (120) installed on the mobile object (5) to determine its instantaneous position and altitude coordinates, wherein the receiving arrangement is designed to receive correction data—comprised of pseudo range correction values (PRC data), valid for the moment of their calculation, as well as of values (RRC data) for the rate of change of the PRC data—wherein the correction data are emitted as data of a radio data system signal (RDS signal) inserted into a radio program signal, the receiving arrangement comprising an arrangement (90, 100) to continuously receive and decode the RDS signal provided with the correction data, and a computer (110) to separate the correction data from the decoded RDS signal and to feed the correction data into the GPS receiver (120) installed on the mobile object (5), which GPS receiver corrects its measurement results according to the separated correction data, characterized in that, for the evaluation of processed correction data (8), wherein the PRC data calculated at a specific moment are calculated back to the moment of the last full minute with the assistance of the associated rate of change values (RRC data), the computer (110) is designed such that a) the calculated-back PRC data are extrapolated to the actual time for each GPS satellite with the assistance of the associated rate of change values (RRC data) and computer-internally generated time information (internal Z count), and b) a non-transmitted header provided in a standardized format for correction data is reconstructed with check words and continuous time information and, together with the extrapolated PRC data for each GPS satellite and the associated RRC data, is put together to form the standardized format of the correction data.

7. A receiving arrangement according to claim 6, characterized in that a time information, which is inserted occasionally into a group of an RDS signal cycle and derived from the received GPS signals, is used by the computer (110) to synchronize the internally generated time information (internal Z count).

8. A receiving arrangement according to claim 6, characterized in that a data identification information (IOD), which is inserted occasionally into a group of an RDS signal cycle and derived from the received GPS signals, is used by the computer (110) to reconstruct the correction data (7) conforming to standard.

* * * * *

UNITED STATES PATENT AND TRADEMARK OFFICE
CERTIFICATE OF CORRECTION

PATENT NO. : 6,018,313
DATED : January 25, 2000
INVENTOR(S) : Engelmayer et al.

It is certified that error appears in the above-identified patent and that said Letters Patent is hereby corrected as shown below:

Title Page:
Item [22] to read as follows:
[22] PCT Filed: Aug. 31, 1996

Signed and Sealed this

Third Day of July, 2001

*Attest:*

*Attesting Officer*

NICHOLAS P. GODICI
*Acting Director of the United States Patent and Trademark Office*